United States Patent [19]
Arko

[11] Patent Number: 5,421,625
[45] Date of Patent: Jun. 6, 1995

[54] AUTOMOTIVE PROTECTIVE PARKING ACCESSORY

[76] Inventor: John K. Arko, 7547 S. Hamilton, Chicago, Ill. 60620

[21] Appl. No.: 34,756

[22] Filed: Sep. 2, 1992

[51] Int. Cl.⁶ .......................... B60R 19/00; B60T 3/00
[52] U.S. Cl. ...................................... 293/128; 188/32
[58] Field of Search ................. 188/32, 4 R; 293/128, 293/126; 280/770

[56] References Cited

U.S. PATENT DOCUMENTS

| | | | |
|---|---|---|---|
| 2,998,102 | 8/1961 | Deverich | 188/32 |
| 3,026,973 | 3/1962 | Piel | 188/32 |
| 3,305,050 | 2/1967 | Newberry | 188/32 |
| 3,338,338 | 8/1967 | Lindeen | 188/32 |
| 3,695,394 | 10/1972 | Carpenter | 188/32 |
| 3,845,844 | 11/1974 | Woerner | 188/32 |
| 4,221,410 | 9/1980 | Dawson | 293/21 |
| 4,437,697 | 3/1984 | Hinojas | 293/128 X |
| 4,571,903 | 2/1986 | Strassner | 293/128 X |
| 4,582,176 | 4/1986 | Roberts | 188/32 |
| 4,653,967 | 3/1987 | Isaksson et al. | 188/32 X |
| 4,711,325 | 12/1987 | Mountz | 188/32 |
| 4,810,013 | 3/1989 | Spears | 296/28 |
| 4,828,076 | 5/1989 | Fox | 180/32 |
| 5,184,857 | 2/1993 | Hawkins | 293/128 |
| 5,263,553 | 11/1993 | Duncan | 188/32 |

FOREIGN PATENT DOCUMENTS

| 1710417 | 2/1992 | U.S.S.R. | 188/32 |
|---|---|---|---|

*Primary Examiner*—Joseph Pape

[57] ABSTRACT

A vehicle parking accessory for protecting vehicles against damage from adjacent vehicles and for deterring theft of the vehicle having a rectangular tubular frame connected to two wheel chock members for front and back tires and a locking apparatus to prevent disassembly of the accessory. The rectangular tubular frame is adjustable to the length and height of a vehicle by a set of turnbuckles located on both the horizontal and vertical frame members. The vehicle parking accessory is further provided with a side protector panel having an interiorly situated shock absorbent cushion which is used to prevent damage such as dents, dimples and scratches to the side of equipped vehicles.

7 Claims, 5 Drawing Sheets

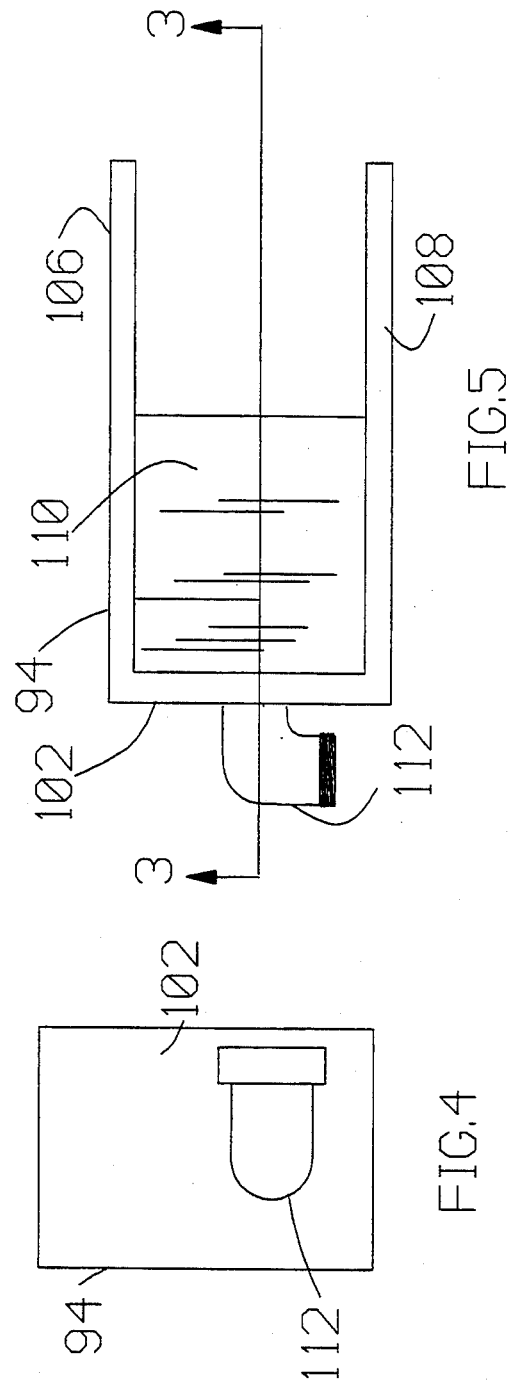
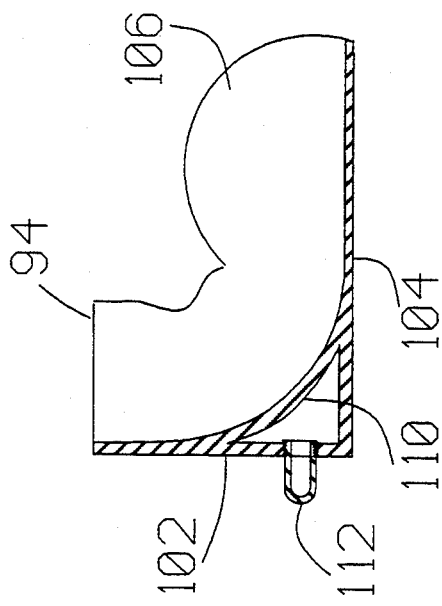
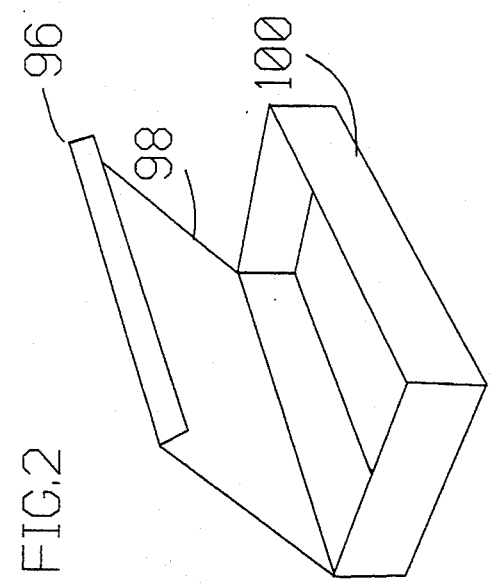

AUTOMOTIVE PROTECTIVE PARKING ACCESSORY

BACKGROUND OF THE INVENTION

The present invention relates to the area of vehicle protective devices, and more particularly devices which protect vehicle doors and mudguards from dents, dimples and scratches. In the past, no device has included both the security features of a locking wheel chock system and the protective features found in vehicle sidepanel protective systems. Other inventions have not addressed a device which combines protection of vehicle sidepanels, protection against theft and unintended rolling of the vehicle out of a parked position. Vehicle doors and mudguards are often the objects of abuse caused by other drivers that park their vehicles too close to the unprotected doors and mudguards and cause dents, dimples and scratches by the another person opening their vehicle door into contact with the unprotected vehicle doors or mudguards.

SUMMARY OF THE INVENTION

The present invention presents a solution to the above problems by means of a relatively simple frame and chock Vehicle Parking Accessory. The present invention consists of a rectangular tubular frame having four frame members containing turn buckles which allow the horizontal frame members to adjustably fit the dimensions required for protection and security of a particular vehicle. The rectangular tubular frame is adapted to securely fit against the side of a vehicle by providing the rectangular frame with a pair of unique high side wall wheel chocks. The horizontal turn buckles which are located on both the upper and the lower horizontal frame members allow the high side wall wheel chocks to slidably engage with both the rear and front vehicle tires. Additionally, the wheel chocks may be used in association with a protruding rod which is capable of being inserted into a tire jack hole located under the rear door panel to provide increased security and stabilize the tubular frame.

A protector panel having an interior shock absorbing panel is mounted on the frame member which protects the vehicle's door panels from damage such as dents, dimples and scratches. The size of the protector panel can be adjusted to suit the size and style of vehicles being protected.

OBJECTS OF THE INVENTION

It is an object of the present invention to protect automotive side panels from damage such as dents, dimples and scratches by providing a protector panel with an interior impact cushion on a rectangular tubular frame which may be secured to the vehicle by means of a pair of wheel chocks.

It is another object of the present invention to protect cars from unlawful entry and theft by providing a structural deterrent in the form of a rectangular tubular frame which may be secured to the vehicle by means of a pair of wheel chocks.

It is yet another object of the present invention to provide a rectangular tubular frame with an unique configuration of wheel chocks having particularly high side walls preventing unauthorized removal of the vehicle parking accessory by lateral twisting of the chock.

It is yet another object of the present invention to provide a rectangular tubular frame with a pair of wheel chocks which is able to protect a vehicle from rolling forward or backward into another vehicle as a result of improper parking brake application, or of unlawfully applied force from an attempted theft.

It is yet another object of the present invention to provide a rectangular tubular frame with a protector panel which is easily installed onto a wide variety of sizes of vehicles by providing the frame with a set of horizontal turn buckles allowing the frame to be easily adjusted in the horizontal direction.

It is yet another object of the present invention to provide a rectangular tubular frame with a protector panel which can be easily installed onto a vehicle and then readily removed, disassembled, and stored in a box conveniently located in a car storage area such as a trunk.

These and other objects and advantages of the present invention can be readily derived from the following detailed description of the drawings taken in conjunction with the accompanying drawings present herein and should be considered as within the overall scope of the invention.

BRIEF DESCRIPTION OF THE DRAWINGS

FIG. 2 is a perspective view of a storage box intended for use with the present invention when it is disassembled for storage.

FIG. 3 is a sectional view of a wheel chock of the present invention shown from section line 3—3 of FIG. 5.

FIG. 4 is a rear view of a wheel chock of the present invention.

FIG. 5 is a top view of a wheel chock of the present invention.

DETAILED DESCRIPTION OF THE DRAWINGS

Figure 1:
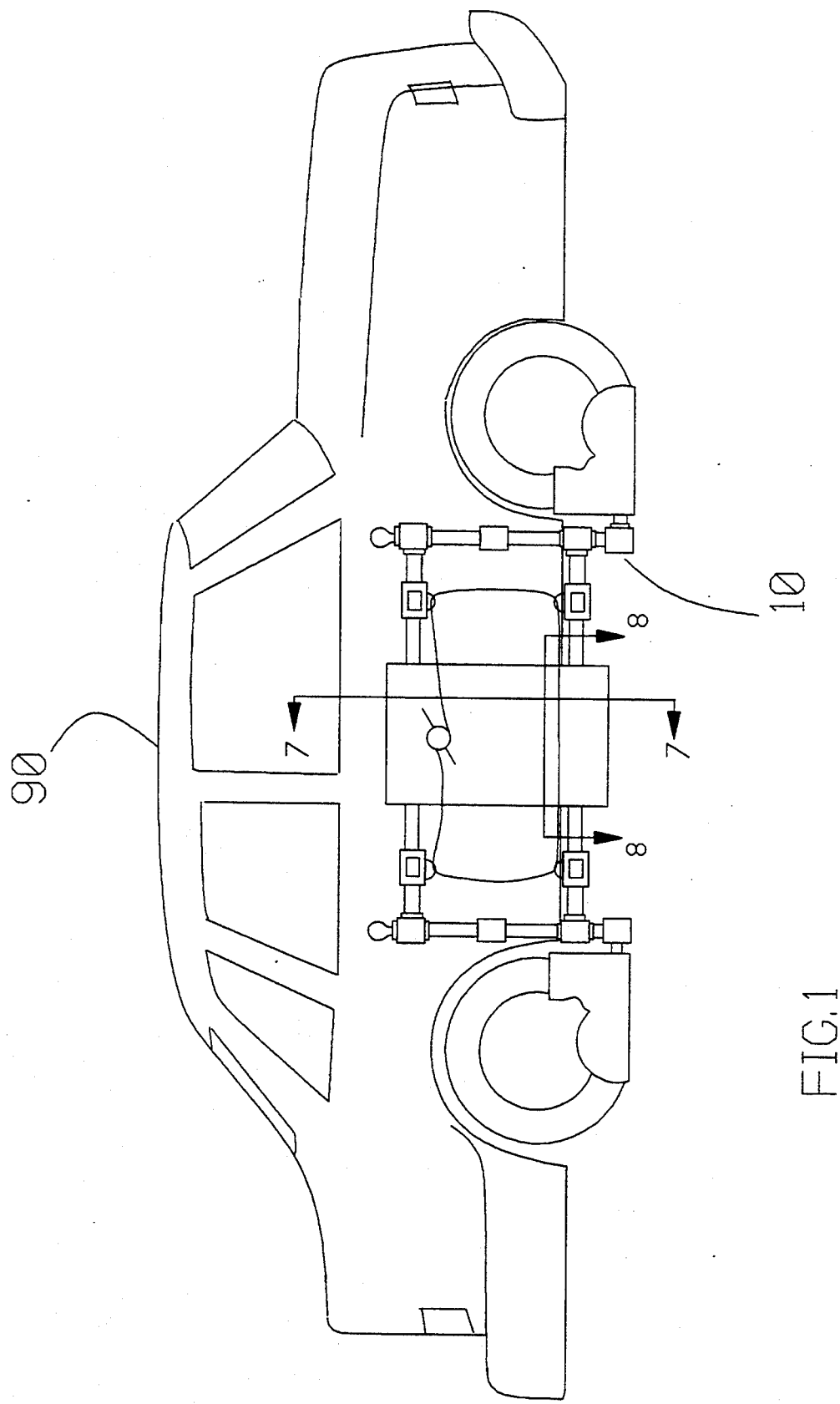
FIG. 1 is a perspective view of a vehicle showing the invention installed onto the side of a vehicle with the wheel chocks secured in place.
Figure 11:
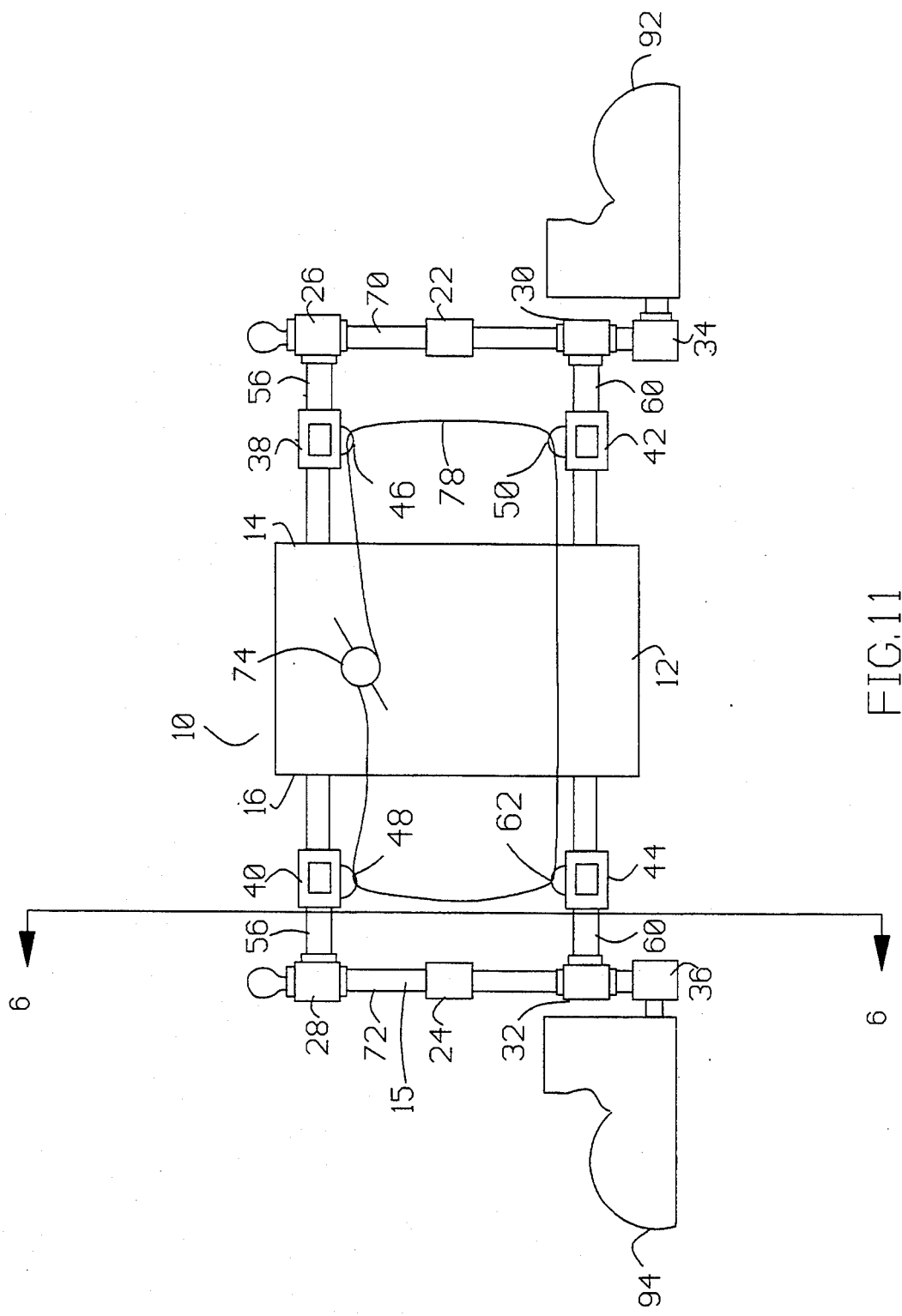
FIG. 11 is a side view of the present invention.

Referring now to FIG. 1 is shown a side view of a vehicle 90 which has vehicle parking accessory 10 attached thereto. Turning to FIG. 11 is shown an enlarged detailed view of vehicle parking accessory 10. Vehicle parking accessory 10 consists of rectangular tubular frame 15 which is attached to both proximal wheel chock 92 and distal wheel chock 94. In a preferred embodiment, the rectangular tube frame 15 may be made of aluminum or plastic pipe material. Rectangular tubular frame 15 consists of upper tube 56 which is connected to proximal tube 70 by proximal elbow 26. Proximal tube 70 is connected lower tube 60 by proximal t-coupling 30. Lower tube 60 in turn is connected to distal tube 72 via distal t-coupling 32. And finally, distal tube 72 is in turn connected to upper tube 56 via distal elbow 28.

Upper tube 56 is provided with two turn buckles, upper proximal turn buckle 38 and upper distal turn buckle 40 which are used to adjust the overall length of the rectangular tubular frame 15 to slidably install proximal wheel chock 92 and distal wheel chock 94 in place. Lower tube 60 is likewise provided with two turn buckles, lower proximal turn buckle 42 and lower distal turn buckle 44 which are also used to adjust the overall length of rectangular tubular frame 15 to slidably install proximal wheel chock 92 and distal wheel chock 94 in place.

Proximal tube 70 is further provided with an in-line coupling, proximal vertical coupling 22, which allows rectangular tubular frame 15 to be easily disassembled when not in use and stored. Likewise, distal tube 72 is provided with an in-line coupling, distal vertical coupling 24, which allows the rectangular tubular frame 15 to be easily disassembled when not in use and stored.

Figure 6:
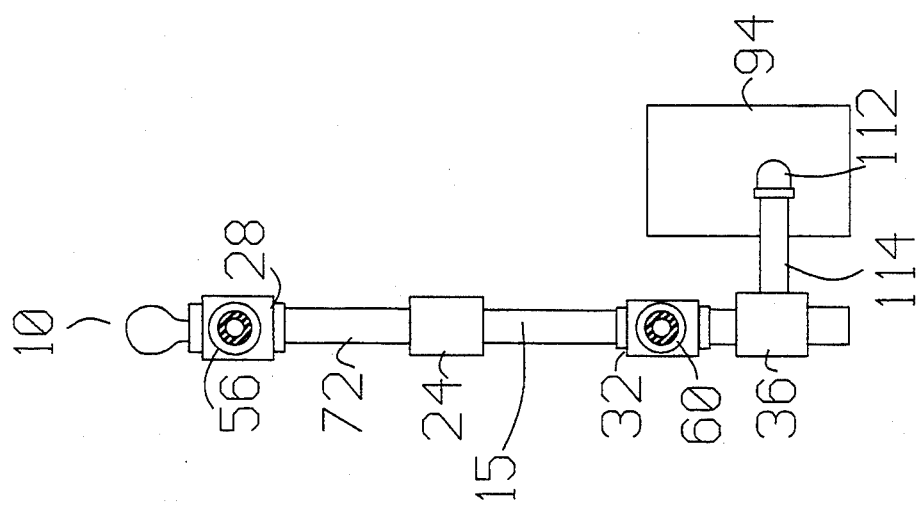
FIG. 6 is a sectional view of the rear of the present invention taken along section line 6—6 of FIG. 11.

As is exemplified in FIG. 6, distal wheel chock 94 is connected to rectangular tubular frame 15 via distal chock elbow 112, to distal chock pipe 114 and then on to distal chock coupling 36 which is in turn connected to distal tube 72. As is shown in FIG. 6, the wheel chocks 92 and 94 are located in a different plane which is closer to vehicle 90 than is the rectangular tubular frame 15. Correspondingly, Proximal wheel chock 92 is connected to rectangular tubular frame 15 via proximal chock coupling 34 which is connected to an chock elbow (not shown), in-line pipe (not shown) and then to proximal tube 70.

The vehicle parking accessory 10 is secured by means of a cable 78 which passes through upper proximal cable loop 46, then through lower proximal cable loop 50, then through lower distal cable loop 52 and finally through upper distal cable loop 48. A twist knob 74 is provided to wrap or unwrap cable 78 to secure or remove vehicle parking accessory 10. A padlock (not shown) may be applied to the twist knob 74 to secure the cable 78 in a variety of manners and methods which would be obvious to persons skilled in the art.

Turning now to FIG. 2 is shown a storage box 96 which is used for storing the vehicle parking accessory 10 when it is disassembled. Cavity 100 is provided to accept the parts of the vehicle parking accessory 10 and lid 98 is provided to secure all of the parts from movement outside storage box 96 while vehicle 90 is in motion.

Turning now to FIG. 3 is shown a cross sectional view of distal wheel chock 94 taken along section line 3—3 of FIG. 5. Shown in this drawing is relatively high wheel chock interior sidewall 106 and wheel chock exterior sidewall 108. These sidewalls are configured relatively high at approximately 6" to 7" deep to prevent unauthorized twisting and turning of the wheel chock 94 while vehicle parking accessory 10 has been installed onto vehicle 90. Further, the wheel chocks are approximately 15" in length allowing for relatively complete engagement of the chocks to a particular vehicle tire as is shown by wheel chock bottom 104. Wheel cup 110 is curved in form and is adapted to fit the outer surface of a vehicle tire. Wheel chock back plate 102 is likewise sufficiently high to prevent unauthorized twisting and turning of wheel chock 94.

Turning now to FIG. 4 is shown a back view of distal wheel chock 94 with distal chock elbow 112 inserted therein. Again, this drawing shows the relatively high form of wheel chock back plate 102 which prevents removal the vehicle parking accessory 10.

Turning now to FIG. 5 is shown a top view of distal wheel chock 94. Curved surface of wheel cup 110 is clearly shown as being adapted to fit the outer surface of a vehicle tire. Distal chock elbow 112 is shown as being inserted in wheel chock back plate 102.

Turning now to FIG. 6 is shown a cross section of line 6—6 of FIG. 11 showing the back portion of vehicle parking accessory 10. In this view it is shown how distal elbow 28 is connected with distal tube 72 which in turn is connected to distal t-coupling 32. A cross section of upper tube 56 and lower tube 60 is also shown. Most importantly, this view shows how distal chock 94 is set back from rectangular tubular frame 15 a short distance towards the vehicle by distal chock pipe 114. Distal chock elbow 112 connects distal chock pipe 114 to distal chock 94.

Figure 7:
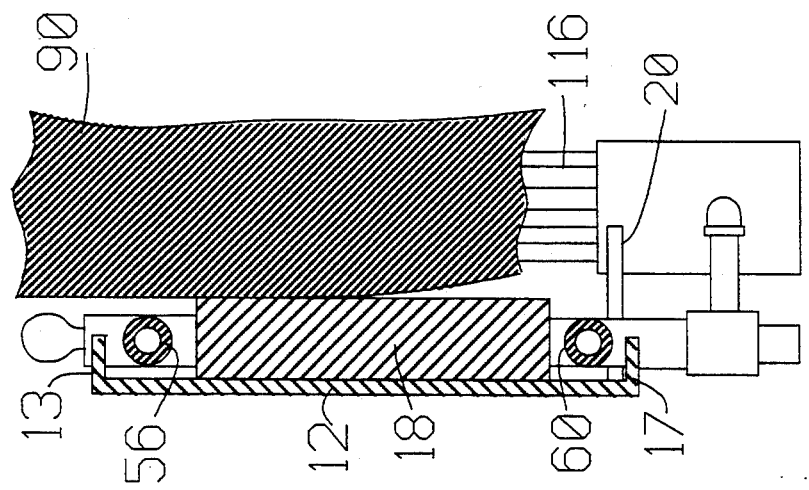
FIG. 7 is a sectional view of the rear vertical portion of the protector panel, a door portion of the vehicle showing the tire and the distal chock taken along section line 7—7 of FIG. 1.

Turning now to FIG. 7 is shown a partial cut away view of the vehicle 90 in the door portion and a cross section of line 7—7 taken from FIG. 1. In this drawing is shown how protector panel 12 has bent ends or flanges which are connected to the sides of protector panel 12. FIG. 7 shows one upper flange 13 and lower flange 17 connected to protective panel 12, although protective panel 12 also has two vertical flanges, proximal vertical flange 14 and distal vertical flange 16, shown in FIG. 11. In one preferred embodiment, these flanges are constructed by bending the ends of the panel 12 inward at a 90° angle and are approximately 1" in depth. However, in other embodiments they may be attached by welding or similar means. FIG. 7 also shows impact cushion 18 which is attached to protector panel 12 and provides protection to equipped vehicle 90 from impacts to the protector panel 12 by another vehicle. Impact cushion 18 is approximately 3" in depth, 16" high and 18" wide for a typical vehicle, although size of impact cushion 18 may vary dependent upon the vehicle being protected. FIG. 7 shows rear tire 116 attached to vehicle 90 and protectively engaged with distal wheel chock 94. Also shown is protruding rod 20 which engages with a jack hole beneath the door panel of vehicle 90 (not shown) and extends perpendicularly from the interior of protective panel 12.

Figure 8:
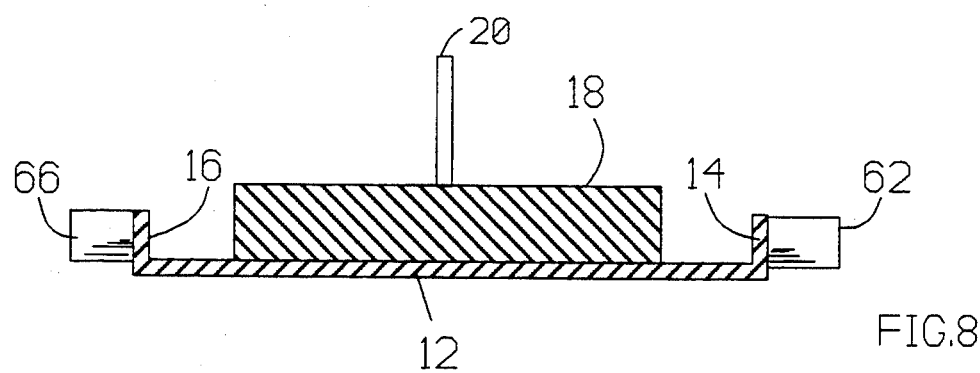
FIG. 8 is a cut away sectional view of the top portion of the protector panel taken along section line 8—8 of FIG. 1.

Turning now to FIG. 8 is shown a cut away sectional view of the top portion of the protector panel 12 taken along section line 8—8 of FIG. 1. FIG. 8 also shows impact cushion 18 in cross section. Also shown is proximal vertical flange 14 attached to an upper proximal tube coupling 62 which secures the protective panel 12 to the upper tube 56. Distal vertical flange 16 is shown attached to lower proximal tube coupling 64 which secures the protector panel 12 to lower tube 60. The tube couplings are approximately 1" in diameter and provide a flush attachment to vertical flanges 14 and 16 which are also 1" in depth. In assembly of a preferred device, the upper and lower tubes 56 and 60 are inserted into the tube couplings to support the protector panel 12. However, in other embodiments, the tube sections may have a threaded connection for the tube couplings for connection to the protector panel 12 or the connection may be accomplished in other ways obvious to someone skilled in the art.

Also shown on FIG. 8 is protruding rod 20 which is adapted to fit a jack hole located beneath the door panel of vehicle 90. Protruding rod 20 is approximately 7" in length and adds stability to the rectangular tubular frame 15.

Figure 9:
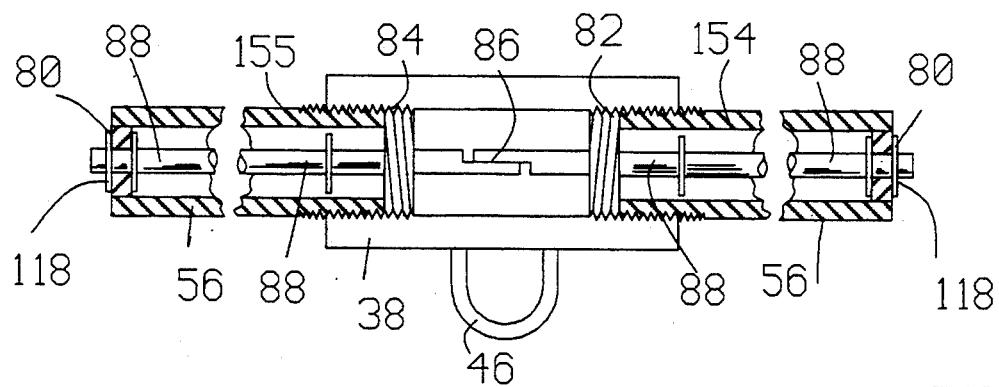
FIG. 9 is a partial cut away sectional view of a turn buckle with the cable loop showing in top view.
Figure 10:
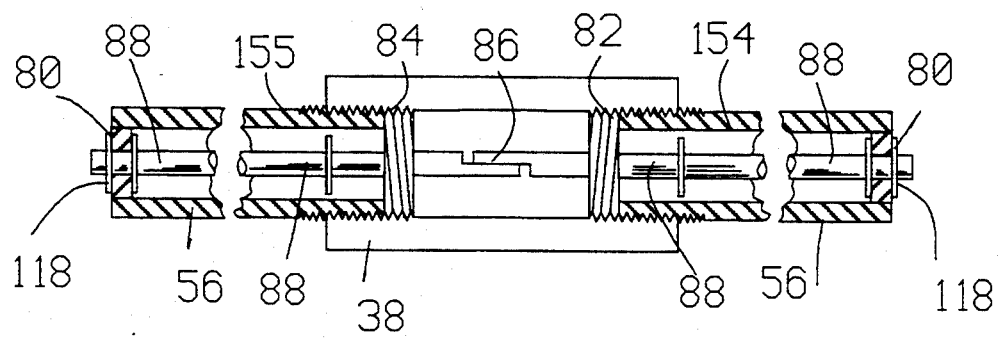
FIG. 10 is a partial cut away section view of a turn buckle with the cable loop turned downward and thus not shown.

In FIG. 9 is shown a partial cut away sectional view of turn buckle 38 with cable loop 46 showing in top view. In FIG. 10 is shown a similar partial cut away section view of turn buckle 38 with the cable loop 46 turned downward. In this embodiment of the invention, reinforcement rod 88 is shown interiorly disposed within upper tube 56. The reinforcement rod 88 in a preferred embodiment is constructed of 5/16" diameter stainless steel rod, although other strong and durable rod materials may be used. The reinforcement rod 88 also provides additional deterrent to theft by preventing disassembly of the vehicle parking accessory 10 by cutting. Any attempt at theft of the vehicle 90 or vehicle parking accessory 10 by cutting is deterred by a unique system of supporting the reinforcement rod 88 within the rectangular tubular frame 15 through the use of clips 118 which allow the reinforcement rod 88 to rotate whereby engagement of the reinforcement rod 88 by a cutting device, for example a hacksaw, would be resisted by the rolling of the reinforcement rod 88 under the cutting device.

Clips 118 located at either end of tube 56 provide support between the reinforcement rod 88 and the tube structure 56 and are connected to tube caps 80 which are adapted to fit around the reinforcement rod 88. The clips 118 and tube caps 80 are attached to the upper and lower tubes 56, 60 in order to hide the reinforced nature of the vehicle parking accessory 10 and to protect the vehicle parking accessory 10 from damage by outside elements. The tube caps 80 have ⅜ central apertures to allow the reinforcement rod 88 to protrude ½ beyond the clips 118 and into each of the tube couplings to which the tube is adjacent. Reinforcement rod 88 is shown with an expansion tongue 86 for adjustment of the length of the rectangular tubular frame 15 to fit different sizes of vehicles.

In this preferred embodiment of the invention the upper tube 56 consists of two segments, a right proximal upper tube 155 and left proximal upper tube 154. Right proximal upper tube 155 has a right hand thread 82 for engagement with corresponding threads on the proximal upper turnbuckle 38 and left proximal upper tube 154 has a left hand thread 84 for engagement with the other end of the proximal upper turnbuckle 38. This means of assembly of the device may be replicated for each tube and turnbuckle junction. Other turnbuckle and tube embodiments, such as are obvious to one skilled in the art, are also contemplated in the present invention.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

I claim:

1. A device for protecting and securing parked vehicles comprising:
    wheel chock means with relatively high sidewalls, with the wheel chock means adapted to slidably engage a portion of a vehicle tire;
    an adjustable tubular frame attached to the tire securement means;
    at least one turn buckle located on the frame capable of adjusting the length of tubular frame; and,
    a locking device cooperatively associated with the length adjusting means.

2. The device of claim 1 wherein the locking device includes a cable cooperatively associated with each of the turnbuckles.

3. The device of claim 2 wherein the locking device further includes a padlock.

4. The device according to claim 1 further having a protective panel secured to the tubular frame which may protect a vehicle from exterior damage.

5. The device according to claim 3 further having an impact cushion attached to the protective panel.

6. A device for protecting and securing parked vehicles comprising:
    wheel chock means with relatively high sidewalls, with the wheel chock means adapted to slidably engage a portion of a vehicle tire;
    an adjustable tubular frame secured to the wheel chock means, with the frame made from a light, durable material, which frame is easily disassembled for storage and further has an impact cushion secured thereto for protecting the side of a vehicle;
    at least one reinforcement rod located within the adjustable tubular frame;
    at least one turn buckle located on the frame capable of adjusting the length of tubular frame; and,
    a locking device including a cable and padlock wherein the cable is cooperatively associated with the length adjusting means.

7. The device of claim 6 wherein the reinforcement rod is constructed having rotation means to rotate axially within the adjustable tubular frame.

* * * * *